Figure 1:
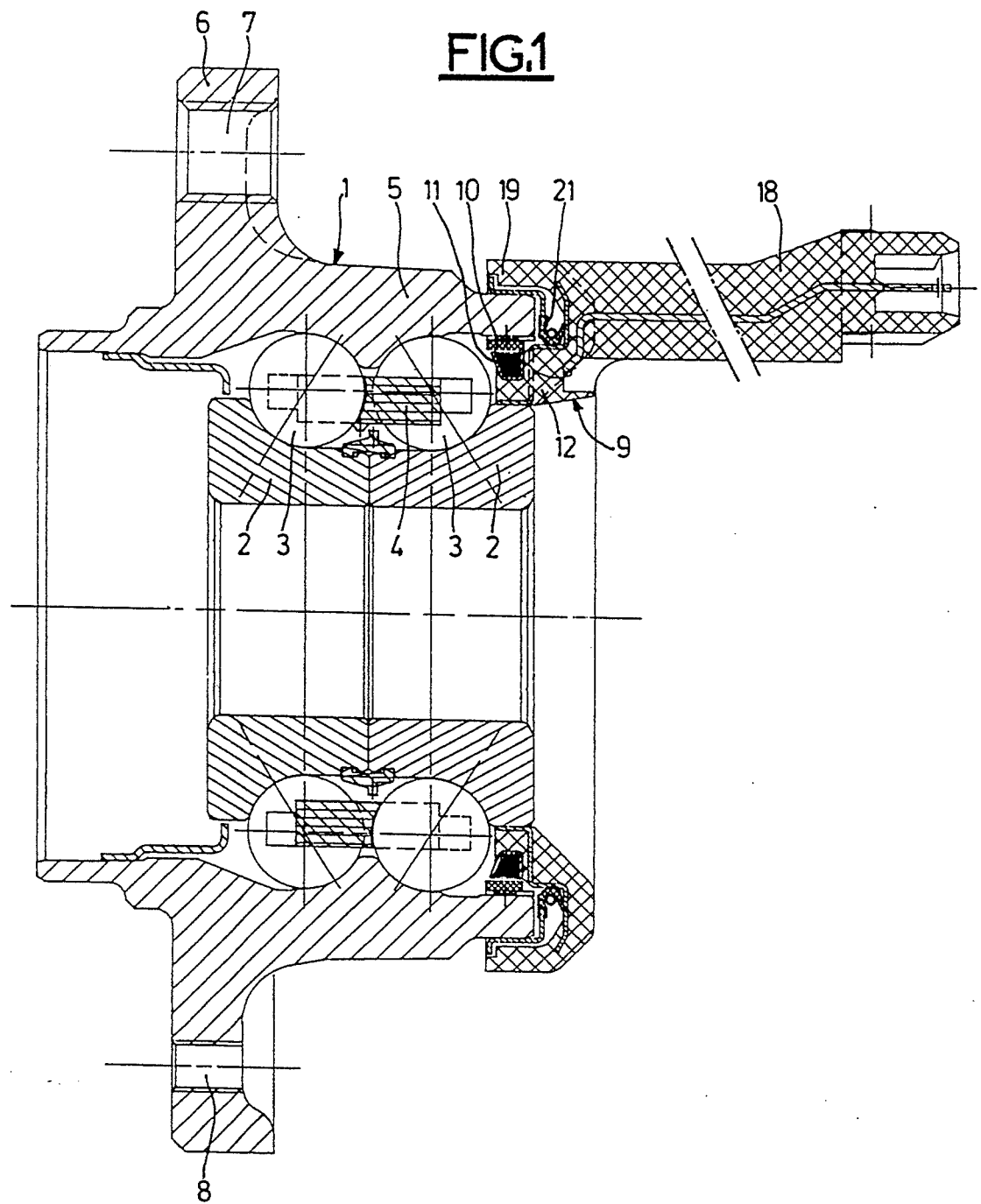

United States Patent [19]

Rigaux et al.

[11] Patent Number: 5,434,503
[45] Date of Patent: Jul. 18, 1995

[54] DEVICE FOR RADIAL DETECTION OF THE ROTATIONAL SPEED OF A ROLLING-CONTACT BEARING, WITH AN ENCODING ELEMENT, A SENSOR ELEMENT AND A SENSOR HOLDER, AND BEARING EQUIPPED WITH SUCH DEVICE

[75] Inventors: Christian Rigaux, Artannes-sur-Indre; Pascal Lhote, Saint-Cyr-sur-Loire; Claude Caillault, Saint-Roch; Christophe Houdayer, Tours, all of France

[73] Assignee: SKF France, Clamart Cedex, France

[21] Appl. No.: 199,711

[22] Filed: Feb. 22, 1994

[30] Foreign Application Priority Data

Mar. 10, 1993 [FR] France ................. 9302769

[51] Int. Cl.[6] .............. G01P 3/488; G01B 7/30
[52] U.S. Cl. ..................... 324/174; 324/207.25
[58] Field of Search .............. 324/173, 174, 207.25; 384/448

[56] References Cited

U.S. PATENT DOCUMENTS 3,500,091 3/1970 Jones .................... 324/174
3,916,234 10/1975 Stigall et al. .

FOREIGN PATENT DOCUMENTS 0511107 10/1992 European Pat. Off. .
2231006 of 0000 France .
2675862 of 0000 France .
4135789 of 0000 Germany .
2251694 7/1992 United Kingdom .

*Primary Examiner*—Walter E. Snow
*Attorney, Agent, or Firm*—Beveridge, DeGrandi, Weilacher & Young

[57] ABSTRACT

The device for detecting the rotational speed of a rolling-contact bearing includes an encoding element provided with a multipolar ring with axial magnetism secured to the rotating race of the bearing. The device further includes a sensor element provided with a passive sensor with a coil wound in an annular magnetic flux concentrator of U-shaped cross-section, and with a sensor holder secured to the non-rotating race of the bearing. The multipolar ring and the sensor element are located radially with an air gap. The magnetic flux concentrator includes a cylindrical part delimited axially by two collecting branches situated radially outside the cylindrical part. At least one of the collecting branches includes teeth on its periphery. Also, that branch of the flux concentrator which is located on the same side as the rolling elements is inclined toward the adjoining row of rolling elements.

20 Claims, 6 Drawing Sheets

DEVICE FOR RADIAL DETECTION OF THE ROTATIONAL SPEED OF A ROLLING-CONTACT BEARING, WITH AN ENCODING ELEMENT, A SENSOR ELEMENT AND A SENSOR HOLDER, AND BEARING EQUIPPED WITH SUCH DEVICE

Device for radial detection of the rotational speed of a rolling-contact bearing, and bearing equipped with such a built-in device.

The present invention relates to a device for detecting the rotational speed of a rolling-contact bearing, for example of a vehicle wheel bearing coupled to an antilock braking system of the ABS type. More particularly, the invention relates to a detection device of radial type in which an encoder secured to the rotating race of the bearing is radially facing a sensor secured to the non-rotating race of the bearing.

The inventors have noticed that the radial arrangement between the encoder and the sensor which are built into a bearing is particularly beneficial in the event of the said bearing being subjected to loads which tend to bring the inner and outer races of the bearing out of true with respect to each other (when a bearing comes out of true, the axes of the inner race and of the outer race are no longer coincident but form a small angle with respect to one another). This phenomenon is frequently encountered in wheel bearings equipping a vehicle when the vehicle is subjected to bends under high lateral acceleration.

An explanatory diagram (FIG. 6) makes it possible to understand better the choice of radial detection of the rotational speed of a bearing. In the diagram, the outer and inner races of the bearing are represented by their respective axis X, X' which form an out of true angle $\alpha$. The encoder secured to the rotating outer (or inner) race of the bearing is in position A', out of true from its normal position A. In the case of radial detection, the detection surface B of the fixed sensor points radially to face the encoder. The radial air gap $e_r$ between the sensor and the encoder varies by $\Delta e_r$ when the bearing runs out of true. In the case of axial detection, the sensor secured to the non-rotating race exhibits a detection surface C pointing axially to face the rotating encoder. The axial air gap $e_a$ between the sensor and the encoder changes by $\Delta e_a$ when the bearing runs out of true.

Figure 6:
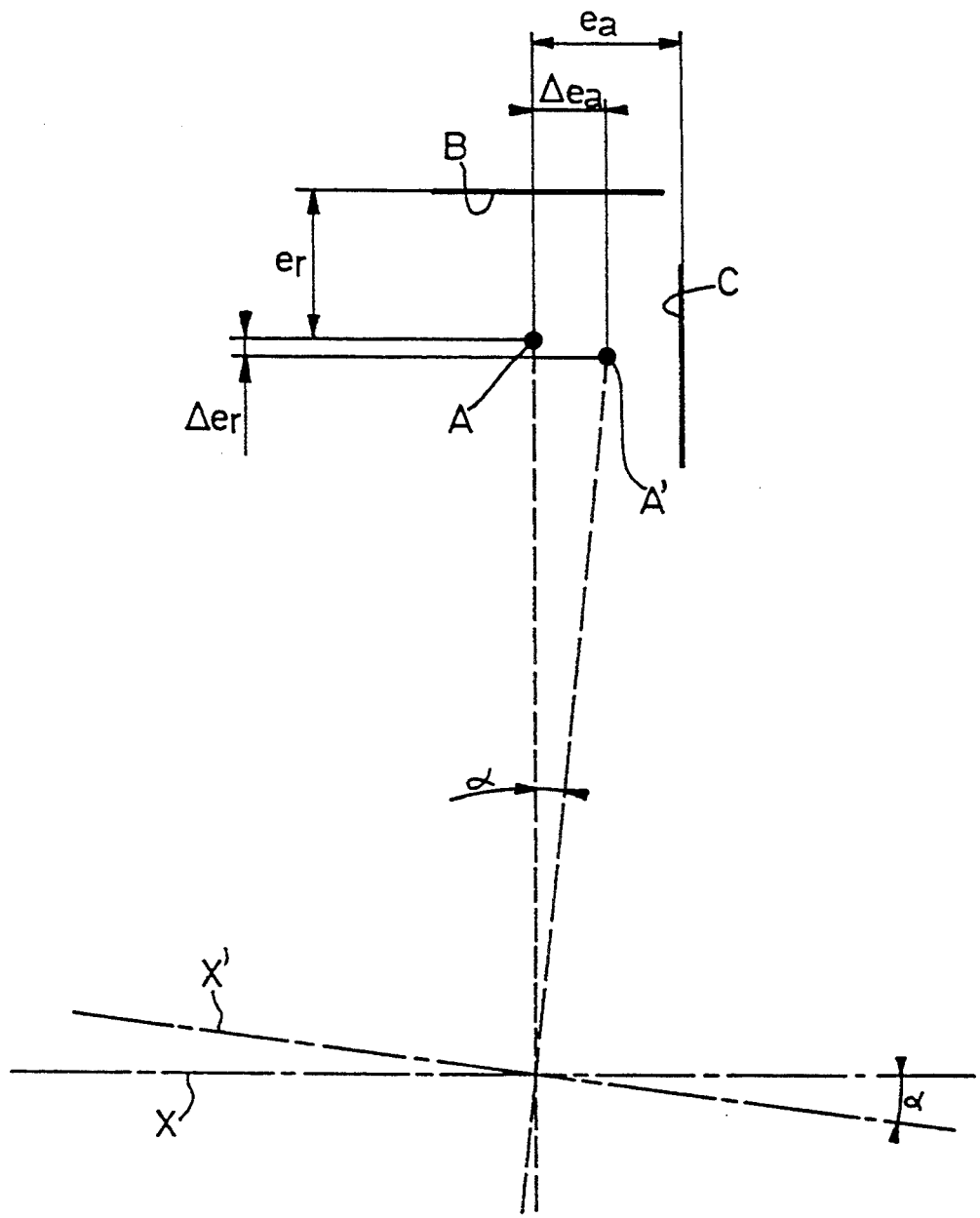

It emerges from FIG. 6 that the ratio $\Delta e_r / \Delta e_a$ is equal to the trigonometric value $\tan \alpha$. Since the out of true angle $\alpha$ is very small (in general less than 10°), the variation in radial air gap $\Delta e_r$ is distinctly less than the variation in axial air gap $\Delta e_a$. As a result, radial detection is much less sensitive to the bearing running out of true, than axial detection.

In the state of the art, devices associated with rolling-contact bearings are known for detecting the rotational speed, both of axial type and of radial type, which are chosen solely on the basis of the structures of the bearings to be equipped, without taking account of the problem of the bearing running out of true.

For example, French Patent Application No. 2,675,862 (Jaeger) may be mentioned, relating to a rolling-contact bearing with a tachometric sensor. The detection device comprises a multipolar ring secured to the rotating race of the bearing and a coil trapped in two annular magnetic flux concentrator pieces in order to form the sensor secured to the non-rotating race of the bearing. The sensor and the encoder (multipolar ring) may face one another radially or axially at one end of the bearing. This detection device exhibits a complex structure especially as regards the flux concentrators, and a significant overall size requiring specific machining of the outer race of the bearing for the purpose of building in the device. In addition, the device does not have a seal allowing it to be protected from the outside environment.

The object of the present invention is to produce a device for radial detection of the rotational speed of a rolling-contact bearing, of simple and compact structure in order to allow it to be mounted in the space available between the outer and inner races of the bearing with high detection performance.

The subject of the invention is also a device for radial detection of the rotational speed of a rolling-contact bearing, in which the encoder is not subjected to internal tensile stresses in the event of differential expansion of the encoder and of its support.

Another object of the invention is to produce a device for radial detection, in which the sensor and the encoder are perfectly isolated from the outside environment by effective sealing means.

The subject of the invention is finally a rolling-contact bearing equipped with a built-in device for radial detection of the rotational speed of the bearing.

According to the invention, the device for detecting the rotational speed of a bearing comprises an encoding element provided with a multipolar ring secured to the rotating race of the bearing, and a sensor element provided with a passive sensor composed of a coil wound in an annular magnetic flux concentrator of U-shaped cross-section and secured to the non-rotating race of the bearing. The multipolar ring and the sensor are located radially facing one another with an air gap.

According to the invention, the magnetic flux concentrator exhibits a cylindrical part axially delimited by two flux collecting branches situated radially outside the cylindrical part. At least one of the collecting branches exhibits teeth on its periphery which point radially to face the multipolar ring which exhibits axial magnetism in an alternating way around its circumference. That collecting branch of the flux concentrator which is located on the same side as the rolling elements of the bearing is inclined towards the row of rolling elements, which makes it possible to make best use of the space available between the outer and inner races of the bearing in order to increase the number of turns of the inductive coil of the passive sensor.

Preferably, the sensor is situated radially inside the multipolar ring, coaxially with it. The multipolar ring is located radially inside a metallic support which includes a tubular axial part to which the multipolar ring is secured.

Preferably, the axial extent of the multipolar ring is greater than the axial extent of the passive sensor (coils/flux concentrator assembly).

According to the invention, the sensor is isolated from the outside environment of the bearing by means of a seal, for example of the rubbing lip type.

Figure 2:
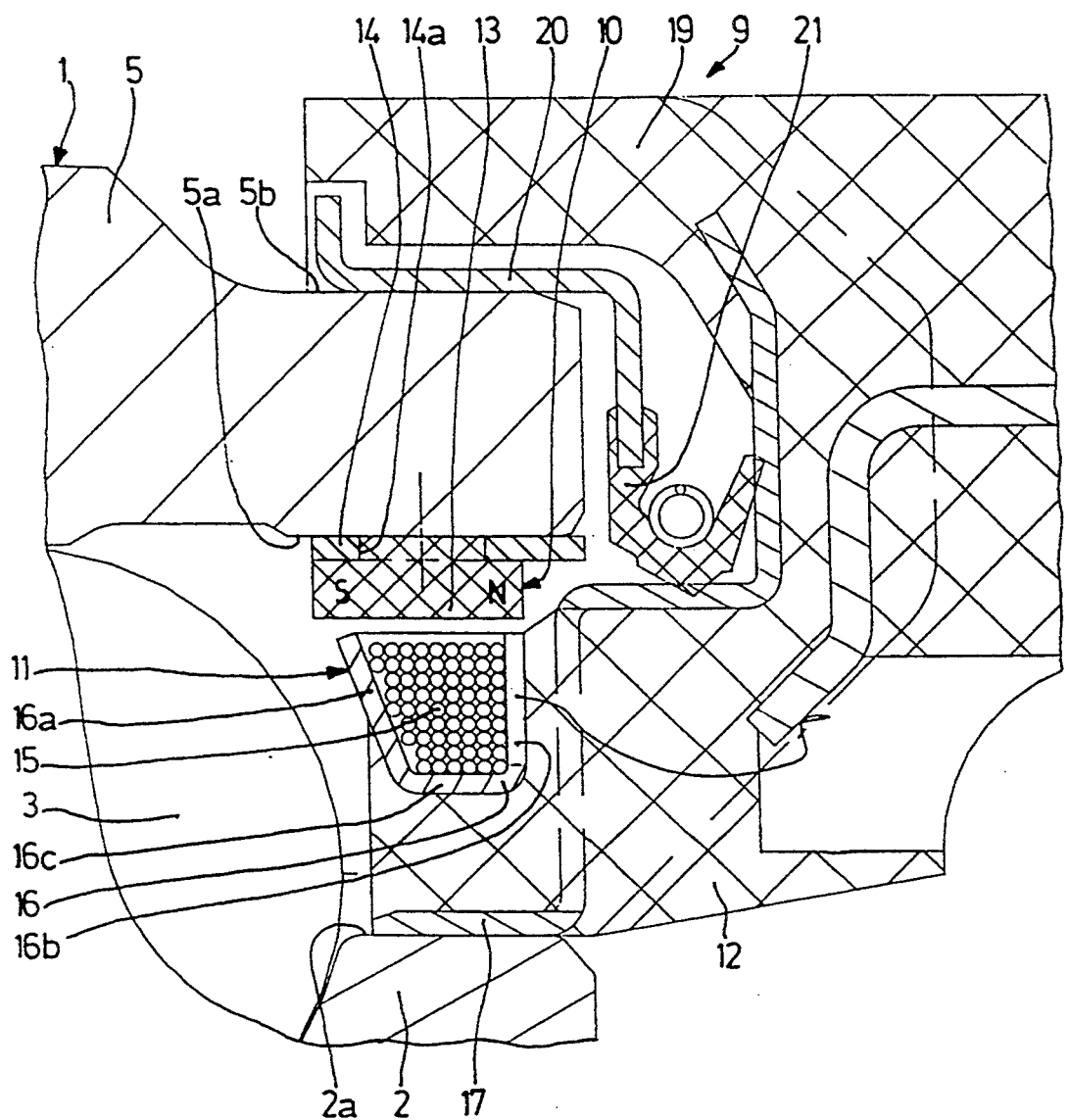
Figure 3:
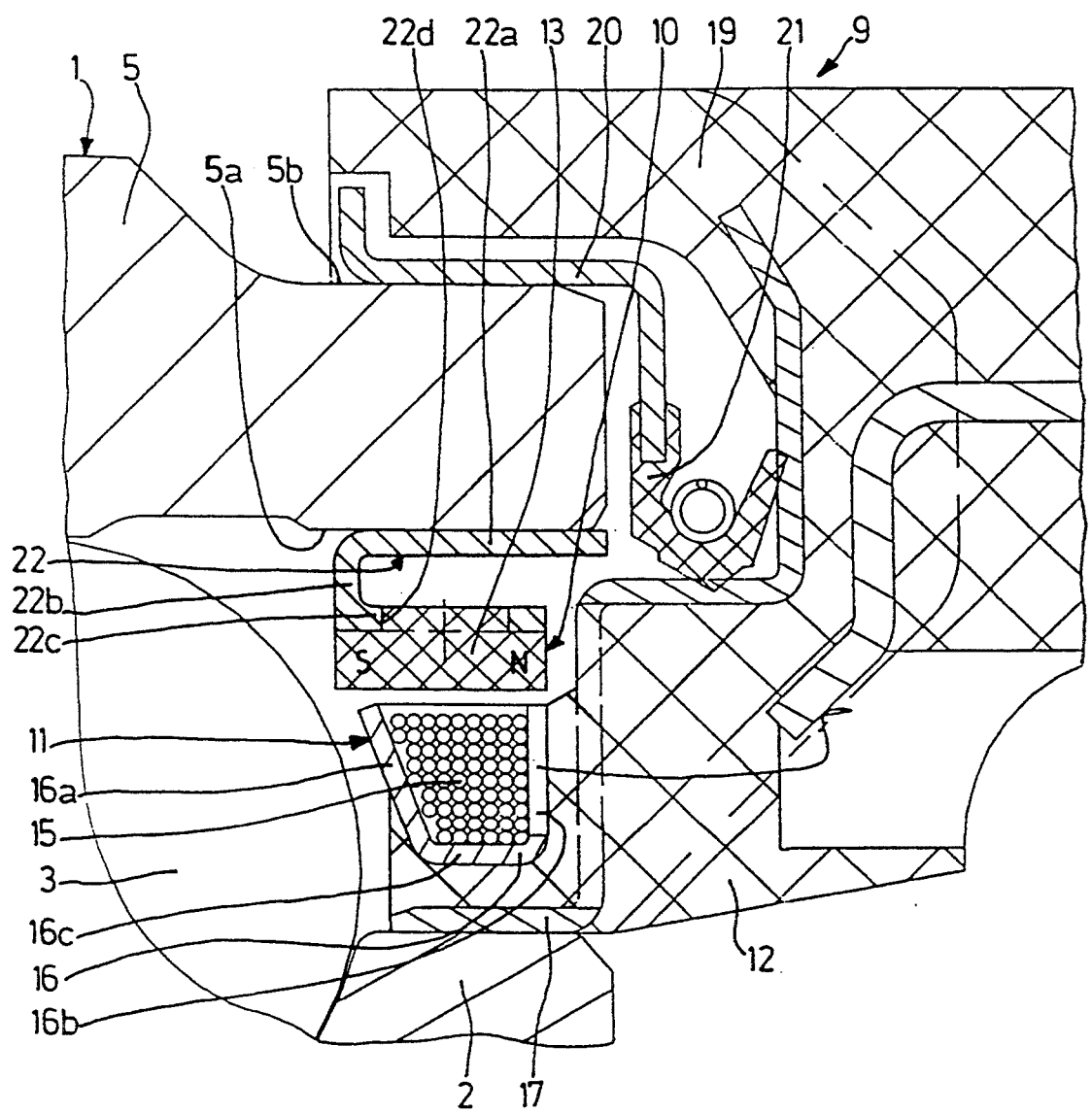
Figure 4:
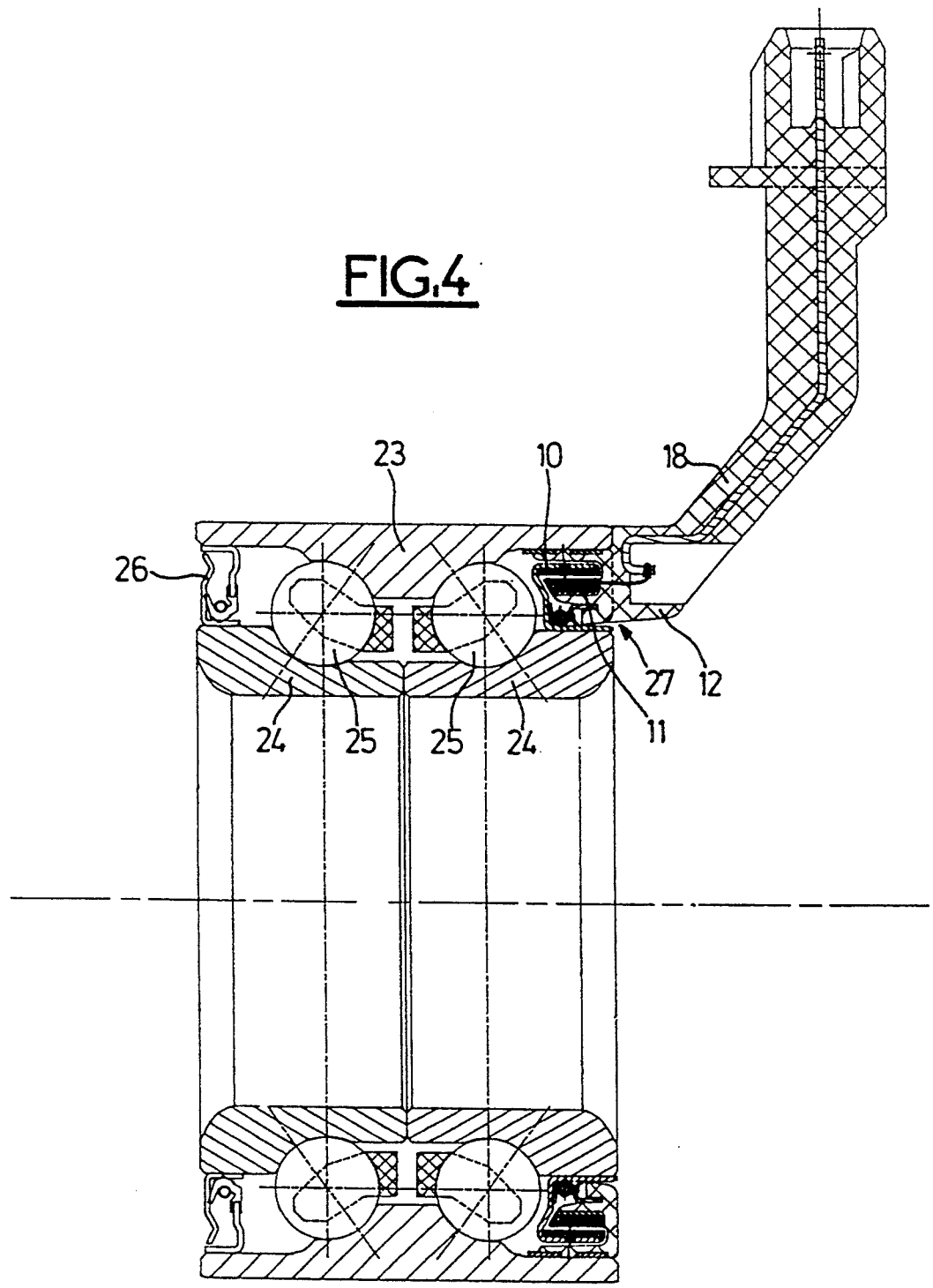
Figure 5:
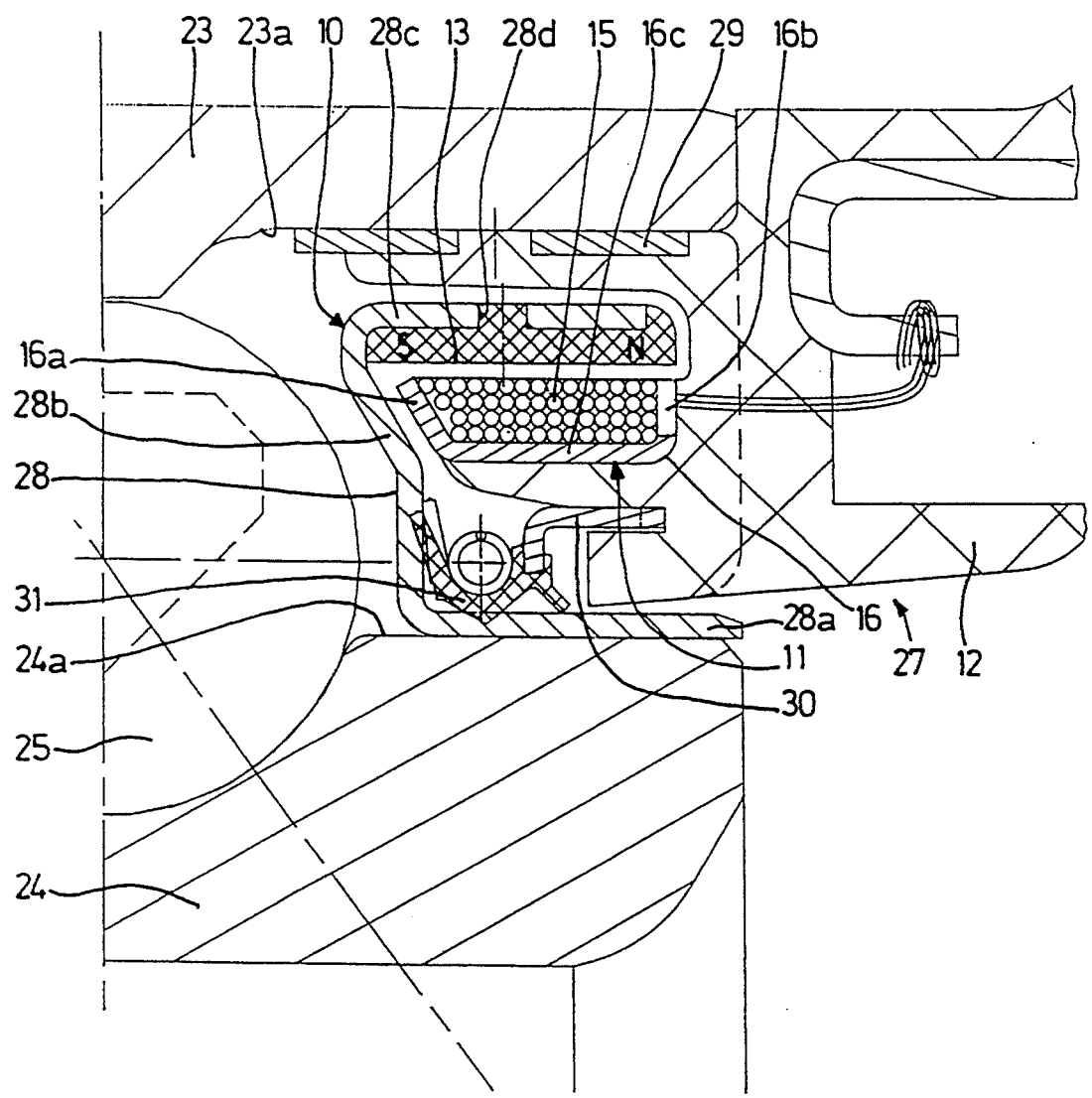

The invention will be better understood upon studying the detailed description of two embodiments given by way of non-limiting examples, and illustrated by the appended drawings, in which:

FIG. 1 is a view in axial section of a vehicle wheel hub bearing equipped with a detection device according to the invention, FIG. 2 is a detailed view of the detection device of FIG. 1, FIG. 3 is a variant of the detection device of FIG. 2, FIG. 4 is a view in axial section of a rolling-contact bearing equipped with a detection device according to a second embodiment of the invention, FIG. 5 is a detailed view of the detection device of FIG. 4, and FIG. 6 is an explanatory diagram showing the influence of the bearing running out of true on the variation in radial and axial air gap between the sensor and the encoder of the detection device.

As illustrated in FIG. 1, the invention may be applied to a wheel bearing. The bearing comprises a rotating outer race 1, two non-rotating inner half-races 2, joined side by side axially, and two rows of balls 3 distributed circumferentially between the outer race 1 and the inner half-races 2 by means of a cage 4. The rotating outer race I exhibits an axial bearing surface 5 which interacts with the bearing balls 3, an annular collar 6 provided with axial perforations 7, 8 which interact with screws or bolts (not represented) for the purpose of mounting a wheel and a brake disc (not represented) on the outer side opposite the axial bearing surface 5 of the outer race 1.

The bearing is equipped with a radial type device 9 for detecting the rotational speed of the bearing for the purpose of supplying electrical signals representing the rotational speed of the outer race 1 of the bearing, therefore of the wheel in question of the vehicle, to a unit for processing the signal, with which the vehicle is equipped.

Referring additionally to FIG. 2, the detection device 9 comprises an encoding element 10 secured to the cylindrical inner surface 5a of the outer race 1 on the end part of the axial bearing surface 5, a sensor element 11 secured to the inner race 2 by means of a sensor holder 12 secured to the cylindrical outer face 2a of the fixed inner race 2. The encoder element 10 comprises a multipolar ring 13 with axial magnetism, made, for example, of plastoferrite, overmoulded on the inner face of a tubular metallic insert 14 provided with peripheral holes 14a improving the anchorage of the multipolar ring. The tubular metallic insert 14 is fitted into the inner cylindrical surface 5a of the rotating outer race 1. The sensor element 11 consists of a sensor of passive type with a coil 15 and an annular flux concentrator 16 which is annular of U-shaped cross-section, the branches 16a and 16b of which constitute the magnetic flux collecting branches for the induction coil 15 which is wound inside the U.

The flux concentrator 16 includes a cylindrical axial part 16c the ends of which are delimited by the flux collecting branches 16a and 16b extending substantially radially outwards. The collecting branch 16a located on the same side as the rows of bearing balls 3, is inclined towards the rows of balls in order to take advantage of the space available between the outer race 1, the inner race 2, and the adjoining row of balls 3. The other collecting branch 16b of the concentrator 16 extends substantially radially with teeth on the periphery and radially faces the multipolar ring 13.

The axial extent of the multipolar ring 13 is greater than the extent of the sensor element 11, which signifies that the axial distance between the ends of the collecting branches 16a and 16b is less than the axial extent of the multipolar ring 13. The fact that the axial extent of the multipolar ring is sufficiently great with respect to the axial extent of the sensor element 11 allows a slight relative axial displacement between the sensor element 11 and the encoder element 10 when the bearing is running out of true (see FIG. 6) without this affecting the quality of detection. The sensor element 11 is located concentrically inside the multipolar ring 13 with a radial air gap between them.

The sensor holder 12 is preferably produced by moulding a plastic over an annular metallic support 17 for fitting and for mechanical reinforcement. The sensor holder 12 advantageously includes a connection head 18 (FIG. 1) for providing the electronic connection between the detection device 9 built into the bearing and the unit for processing the signal, which is not represented.

The sensor holder 12 exhibits an outer tubular bearing surface 19 which externally caps the end of the axial bearing surface 5 of the rotating outer race 1, without contact with it. On the outer cylindrical surface 5b of the outer race I at the end of its axial bearing surface 5, is fitted an annular metallic support 20 provided with an annular seal 21 with a rubbing lip which interacts with an annular bend in the annular metallic piece 17 of the sensor holder 12 in order to provide sealing of the detection device 9 as regards the outside. The metallic support 20 of the seal 21 furthermore forms a labyrinth seal with the tubular bearing surface 19 of the sensor holder 12, preventing contaminating particles or splashes from the outside environment from reaching the seal 21.

FIG. 3 shows an embodiment variant of the detection device 9. In comparison with FIG. 2, the only change consists in the structure of the sensor element 10 the metallic insert 14 of which is replaced by an annular metallic support 22 with a tubular bearing surface 22a for fitting, comparable with the metallic insert 14 of FIG. 2, a radial connection part 22b extending internally, followed by a second axial tubular part 22c on the inner surface of which the multipolar ring 13 is overmoulded. The second tubular part 22c of the metallic support 22 includes peripheral holes 22d for the purpose of improving the anchorage of the multipolar ring in the metallic support 22. The structure of the encoding element 10 makes it possible to prevent direct contact between the outer race 1 of the bearing and the plastic multipolar ring, which makes it possible further to reduce the internal mechanical stresses experienced owing to the differential thermal expansion between the various pieces.

FIGS. 4 and 5 show a second embodiment of the invention which is completely comparable with the first embodiment described previously. In this example, the bearing in question is not specially designed to equip a vehicle wheel hub. This bearing comprises a fixed outer race 23, two rotating inner half-races 24 secured to a rotating shaft which is not represented, and two rows of rolling elements in the form of balls 25 lying between the outer race 23 and the inner half-races 24. One end (to the left of FIG. 4) of the bearing is sealed by a conventional seal 26, and the other end of the bearing is equipped with a radial type device 27 for detecting the rotational speed of the bearing.

The encoder element 10 comprises a multipolar ring 13 and a metallic support 28 which includes a tubular fitting part 28a, a radial part 28b with inclination towards the rows of rolling elements 25, and a tubular part 28c on the inner face of which the multipolar ring 13 is overmoulded. The tubular part 28c exhibits peripheral holes 28d improving the anchorage of the multipolar ring. The inclination of the radial part 28b of the metallic support 28 makes it possible to increase the axial extent of the multipolar ring 23 and of the sensor element 11 taking advantage of the space available in the vicinity of the row of balls 25. The sensor element 11 comprises an induction coil 15 and a magnetic flux concentrator 16 which is completely similar to the structure described previously. The sensor element 11 is located coaxially inside the multipolar ring 13 with a radial air gap. The sensor holder 12 comprises a metallic insert 29 for fitting, a connection head 18, and a metallic support 30 for a seal 31, the metallic support 30 being anchored in the sensor holder 12.

Upon mounting, the encoder element 10 is fitted by virtue of the tubular part 28a of the metallic support 28 onto the cylindrical outer surface 24a of the rotating inner race 24. The sensor holder 12 is fitted, with the aid of the metallic insert 29, onto the cylindrical inner surface 23a of the outer race 23. The seal 31 is of the rubbing lip type and interacts with the bend formed between the tubular fitting part 28a and the radial part 28b of the metallic support 28 of the encoder element 10.

The assembly formed by the encoder element 10 and the sensor element 11 is housed inside the space between the outer race 1, 23 and inner race 2, 24 on one side of one of the rows of rolling elements 3, 25. By virtue of the invention, it is not necessary to carry out specific machining of the bearing races in order to build in the detection device 9, 27, in which the quality and the power of the signal delivered are satisfactory. The multipolar ring 13 has axial magnetism with the magnetic poles S, N coming to face the free ends of the connecting branches 16a, 16b of the magnetic flux concentrator 16. The inclination of one branch 16a of the flux concentrator towards the adjoining row of rolling elements 3, 25 and the radial detection makes it possible at the same time to make best possible use of the space available in order to optimize the dimensioning and number of turns of the induction coil 15 (optimum power of the signal delivered), and to reduce as far as possible the variations in air gap between the multipolar ring 13 and the sensor element 11 which could result from the bearing running out of true.

We claim:

1. Device (9, 27) for detecting rotational speed of a rolling-contact bearing, comprising an encoding element (10) provided with a multipolar ring (13) with axial magnetism and secured to a rotating race (1, 24) of the bearing, a sensor element (11) provided with a passive sensor with a coil (15) wound in an annular magnetic flux concentrator (16) of U-shaped cross-section, and with a sensor holder (12) secured to a non-rotating race (2, 23) of the bearing, the multipolar ring and the sensor element being located radially facing each other with an air gap, said magnetic flux concentrator (16) including a cylindrical part (16c) axially delimited by two collecting branches (16a, 16b) situated radially outside the cylindrical part, at least one of the collecting branches including teeth on its periphery, and a branch (16a) of the flux concentrator which is located on a common side as a row of rolling elements (3, 25) of the bearing being inclined towards the adjoining row of rolling elements.

2. Detection device according to claim 1, characterized in that the sensor element (11) is situated radially inside the multipolar ring (13), coaxially to it, and that the multipolar ring is secured to a tubular axial part (14, 22c, 28c) of an annular metallic support (14, 22, 28).

3. Detection device according to claim 2, characterized in that the said axial tubular part includes peripheral holes (14a, 22d, 28d) allowing anchorage of the multipolar ring (13).

4. Detection device according to claim 2, characterized in that the said tubular axial part consists of a metallic insert (14) fitted directly onto the rotating race (1) of the bearing.

5. Detection device according to claim 2, characterized in that the metallic support (22, 28) furthermore includes a tubular fitting part (22a, 28a) for fitting the metallic support onto a cylindrical surface (5a) of the rotating race (1, 24) of the bearing, and a radial part (22b, 28b) for connection between the tubular axial part (22c, 28c) supporting the multipolar ring (13) and the tubular fitting part.

6. Detection device according to claim 1, characterized in that the axial extent of the multipolar ring (13) is greater than the axial extent of the sensor element (11).

7. Detection device according to claim 1, further comprising a seal (21, 31) with rubbing lip for isolating the encoder element (10) and the sensor element (11) from the outside environment of the bearing.

8. Detection device according to claim 7, characterized in that the seal (21) is secured to an annular metallic support (20) exhibiting a tubular part for fitting over the rotating race (1) of the bearing, the sealing lip interacting with an annular metallic element (17) forming part of the sensor holder (12).

9. Detection device according to claim 7, characterized in that the seal (31) is secured to an annular metallic support (30) anchored in the sensor holder (12) and interacts with a metallic support (28) of the encoder element (10).

10. Rolling-contact bearing equipped with the device (9, 27) for detecting the rotational speed of its rotating race with respect to its non-rotating race.

11. Detection device according to claim 1 wherein the rotating and non-rotating races have an outer free edge spaced axially outwardly from the row of rolling elements, and said sensor element and encoding element are positioned axially inward of the outer free edge of said races so as to be housed within a space defined by said races.

12. Device (9, 27) for detecting the rotational speed of a rolling-contact bearing, comprising an encoding element (10) provided with a multipolar ring (13) with axial magnetism and secured to a rotating race (1, 24) of the bearing, a sensor element (11) provided with a passive sensor with a coil (15) wound in an annular magnetic flux concentrator (16) of U-shaped cross-section, and with a sensor holder (12) secured to a non-rotation race (2, 23) of the bearing, the multipolar ring and the sensor element being located radially facing each other with an air gap and said encoding element and sensor element being housed inside a space formed between the rotating and non-rotating races, said magnetic flux concentrator (16) including a cylindrical part (16c) axially delimited by two collecting branches (16a, 16b) situated radially outside the cylindrical part, at least one of the collecting branches including teeth on its periphery, and a branch (16a) of the flux concentrator, which is located on a common side as a row of rolling elements (3, 25) of the bearing, being inclined toward the adjoining row of rolling elements.

13. Detection device according to claim 12, characterized in that the sensor element (11) is situated radially inside the multipolar ring (13), coaxially to it, and that the multipolar ring is secured to a tubular axial part (14, 22C, 28c) of an annular metallic support (14, 22, 28).

14. Detection device according to claim 13, characterized in that the said axial tubular part includes peripheral holes (14a, 22d, 28d) allowing anchorage of the multipolar ring (13).

15. Detection device according to claim 13, characterized in that the said axial tubular part consists of a metallic insert (14) fitted directly onto the rotating race (1) of the bearing.

16. Detection device according to claim 13, characterized in that the metallic support (22, 28) furthermore includes a tubular fitting part (22a, 28a) for fitting the metallic support onto a cylindrical surface (5a) of the rotating race (1, 24) of the bearing, and a radial part (22b, 28b) for connection between the tubular axial part (22c, 28c) supporting the multipolar ring (13) and the tubular fitting part.

17. Detection device according to claim 12, characterized in that the axial extent of the multipolar ring (13) is greater than the axial extent of the sensor element (11).

18. Detection device according to claim 12, further comprising a seal (21, 31) with rubbing lip for isolating the encoder element (10) and the sensor element (11) from the outside environment of the bearing.

19. Detection device according to claim 17, characterized in that a seal (31) is secured to an annular metallic support (30) anchored in the sensor holder (12) and interacts with a metallic support (28) of the encoder element (10).

20. Rolling-contact bearing equipped with the device (9, 27) defined by claim 12 for detecting the rotational speed of the rotating race with respect to its non-rotating race.

* * * * *